(12) United States Patent
Martz et al.

(10) Patent No.: US 12,544,198 B2
(45) Date of Patent: Feb. 10, 2026

(54) DENTAL MODEL GRIPPING SYSTEM

(71) Applicant: ArchForm, Inc., Sunnyvale, CA (US)

(72) Inventors: Andrew Martz, Sunnyvale, CA (US); Martin Martz, Sunnyvale, CA (US); Joe Sinopoli, Palo Alto, CA (US); Brian Roe, Auburn, CA (US); Jordan Schwarz, Antelope, CA (US)

(73) Assignee: ArchForm, Inc., Santa Clara, CA (US)

( * ) Notice: Subject to any disclaimer, the term of this patent is extended or adjusted under 35 U.S.C. 154(b) by 756 days.

(21) Appl. No.: 17/977,242

(22) Filed: Oct. 31, 2022

(65) Prior Publication Data
US 2024/0138962 A1    May 2, 2024

(51) Int. Cl.
*A61C 11/08*    (2006.01)
*A61C 11/00*    (2006.01)

(52) U.S. Cl.
CPC .......... *A61C 11/082* (2013.01); *A61C 11/006* (2013.01)

(58) Field of Classification Search
CPC ..... A61C 11/082; A61C 11/006; A61C 13/12; A61C 13/34
See application file for complete search history.

(56) References Cited

U.S. PATENT DOCUMENTS 4,184,840 A * 1/1980 Gamberg .............. F27D 5/0043
432/259
5,352,117 A * 10/1994 Silva .................... A61C 11/001
433/34

FOREIGN PATENT DOCUMENTS

DE           2160484 A1 *  6/1973

* cited by examiner

*Primary Examiner* — Jason L Vaughan
*Assistant Examiner* — Amanda Kreiling
(74) *Attorney, Agent, or Firm* — Cognition IP, P.C.; Edward Steakley; Justin White

(57) ABSTRACT

A dental model gripping system can include a dental model and a dental model gripper. The dental model can include a replica set of teeth and a flat bottom surface there beneath that can include first and second vertical openings spaced apart by an opening distance. The dental model gripper can have a flat top surface and first and second pins extending vertically therethrough that can slide toward and away from each other. The first and second pins can be slid to an engaging position where they are spaced apart by the opening distance and are insertable into the vertical openings of the dental model, can be slid away from each other to a gripping position while inserted into the vertical openings, and can press against internal surfaces within the vertical openings to grip firmly the bottom surface of the dental model against the top surface of the dental model gripper.

20 Claims, 11 Drawing Sheets

DENTAL MODEL GRIPPING SYSTEM

TECHNICAL FIELD

The present disclosure relates generally to dental devices, and more particularly to the creation and use of dental devices and components.

BACKGROUND

Dental models are useful in a variety of applications for dentistry, orthodontics, research, and the like. Customized dental models can be especially helpful in the design and formation of veneers, braces, aligners, and other corrective and restorative items for dental and orthodontic patients. A wide variety of different uses have been devised for dental models in numerous applications, and many of these different uses often involve the need to handle and manipulate a given dental model in various ways. For example, customized dental models are often handled and manipulated many times during the creation of customized aligners for different orthodontic patients. Such dental models are even handled and manipulated sometimes during the creation of customized teeth replicas on the dental models themselves.

Unfortunately, many steps during the handling and manipulation of dental models require manual holding, positioning, and/or mounting of the dental models. This can often lead to inconsistencies, user error, and other issues. Even where some automation is involved, a user must still typically mount dental models manually to a sturdy and reliable support system to facilitate automated processing. This can be time consuming and tedious when mounting and unmounting is required for numerous different dental models over a given processing session.

Although traditional ways of handling dental models have worked well in the past, improvements are always helpful. In particular, what is desired are dental model gripping systems that allow for the consistent and accurate handling of dental models during automated processing, especially with respect to the rapid mounting and release of the dental models.

SUMMARY

It is an advantage of the present disclosure to provide dental model gripping systems that allow for the consistent and accurate handling of dental models during automated processing, especially with respect to the rapid mounting and release of the dental models. The disclosed features, apparatuses, systems, and methods provide improved dental model gripping solutions that involve dental model grippers that can quickly grip and firmly hold dental models and that can also quickly release the held dental models. These advantages can be accomplished at least in part by using a standardized gripping geometry at the bottom of system compliant dental models as well as a dental model gripper that can quickly and accurately, grip, hold, and release any dental model using the standardized gripping geometry.

In various embodiments of the present disclosure, a dental model gripping system can include at least a first dental model and a dental model gripper. The first dental model can include a first upper region including a first replica set of teeth, a first lower region coupled to the first upper region, the first lower region including a horizontal bottom surface having one or more flat areas, and a first gripping geometry positioned along the bottom surface. The first gripping geometry can include first and second vertical openings through the bottom surface and spaced apart by a first opening distance. Each of the first and second vertical openings can include an enlarged region and a narrower slotted region extending away from the enlarged region in a direction opposite the other vertical opening. The dental model gripper can include a base, a shaft, a spring, a lever, a gear, a plate, first and second vertically oriented pins, and first and second pin carriers. The base can include a top side, a bottom side, a central opening at the bottom side, and first and second recesses formed therein. The shaft can define a longitudinal vertical axis and can extend longitudinally into the central opening of the base. The shaft can be configured to be rotated along its vertical axis in frontwards and backwards directions. The spring can be coupled to the shaft beneath the base and can be configured to bias the shaft toward a fully backwards rotational position. The lever can be coupled to the shaft beneath the base and can extend from the shaft in a non-parallel direction to the vertical axis. The lever can be configured to rotate the shaft to a fully frontwards rotational position. The gear can have gear teeth, can be coupled to the shaft within the base, and can be configured to rotate with the shaft about the vertical axis. The plate can be coupled to the top side of the base and can have a flat upper surface and first and second slotted openings therethrough. The first and second slotted openings can be oriented along a single straight line. The first and second vertically oriented pins can extend through the first and second slotted openings of the plate. Each of the first and second vertically oriented pins can have a pin head with a diameter that is greater than the diameter of its pin, and each pin head can be configured to pass vertically through the enlarged region of a vertical opening of the gripping geometry while being unable to pass vertically through the narrower slotted region of that vertical opening. The first and second pin carriers can be located within the first and second recesses within the base. Each of the first and second pin carriers can be coupled to a respective one of the first and second vertically oriented pins and can have a toothed portion that engages the gear teeth. Each of the first and second pin carriers can be configured to reside at a default position with its respective pin at a maximum distance away from the vertical axis when the shaft is biased toward the backwards rotational position by the spring and to slide in a direction orthogonal to the vertical axis so that its respective pin moves to a fully actuated position with its respective pin at a minimum distance away from the vertical axis when the lever rotates the shaft to the fully frontwards rotational position.

In various detailed embodiments of this dental model gripping system, the first and second vertical openings of the first dental model can be configured to receive collectively the first and second vertically oriented pins of the dental model gripper therethrough when the shaft is rotated to a first rotational position between the fully backwards rotational position and fully frontwards rotational position. The replica set of teeth can have the same size and shape as the teeth of a human patient. In some arrangements, the first vertically oriented pin can be integrally formed with the first pin carrier and the second vertically oriented pin can be integrally formed with the second pin carrier. The gear can be a spur gear and the spring can be a torsion spring.

In various further detailed embodiments, the dental model gripper can further include a support bracket having a first mounting component extending into and mounted within the central opening of the base, a second mounting component configured to mount the dental model gripper to an external item, and a hollow center region configured to hold and stabilize the shaft therein. The dental model gripping system can also include a second dental model including a second upper region including a second replica set of teeth, a second lower region coupled to the second upper region, the second lower region including a horizontal bottom surface having one or more flat areas, and a second gripping geometry positioned along the bottom surface. The second gripping geometry can include third and fourth vertical openings through the bottom surface and spaced apart by a second opening distance that is different than the first opening distance. Each of the third and fourth vertical openings can include an enlarged region and a narrower slotted region extending away from the enlarged region in a direction opposite the other vertical opening. The third and fourth vertical openings can be configured to receive collectively the first and second vertically oriented pins of the dental model gripper therethrough when the shaft is rotated to a second rotational position between the fully backwards rotational position and fully frontwards rotational position, and the second rotational position can be different than the first rotational position.

In further embodiments of the present disclosure, a dental model gripping system can include a dental model and a dental model gripper. The dental model can include a replica set of teeth and a substantially flat bottom surface located beneath the replica set of teeth, The substantially flat bottom surface can include first and second vertical openings spaced apart by an opening distance. The dental model gripper can have a substantially flat top surface and first and second pins extending vertically through the top surface. At least one of the first and second pins can be configured to move in a sliding motion toward and away from the other pin. The first and second pins can be configured to be arranged at an engaging position where the first and second pins are spaced apart by the opening distance and are insertable into the first and second vertical openings of the dental model. The first and second pins can be further configured to be arranged at a gripping position while inserted into the first and second vertical openings of the dental model, the gripping position resulting in a greater distance between the first and second pins than the opening distance. Also, at least one of the first and second pins can press against internal surfaces within the first and second vertical openings of the dental model to grip firmly the bottom surface of the dental model against the top surface of the dental model gripper while the first and second pins are at the gripping position.

In various detailed embodiments of this dental model gripping system, the first and second pins cannot be released from the dental model while the first and second pins are at the gripping position. In such arrangements, each of the first and second vertical openings can include an enlarged region and a narrower slotted region extending away from the enlarged region in a direction opposite the other vertical opening. In some arrangements, the first and second pins can be spring biased toward the gripping position. Also, the substantially flat bottom surface of the dental model can conform to a standardized gripping geometry suitable for use with the dental model gripper. In such arrangements, the dental model gripper can be configured to grip other dental models having a substantially flat bottom surface that also conform to the standardized gripping geometry. At least some of the other dental models can include substantially flat bottom surfaces with vertical openings spaced apart by a distance that is different than the opening distance of the dental model.

In various further detailed embodiments, the dental model gripper can further include a base having a top side, a bottom side, and a central opening at the bottom side, a shaft defining a longitudinal vertical axis and extending longitudinally into the central opening of the base, wherein the shaft is configured to be rotated along its vertical axis in frontwards and backwards directions, and one or more translation components located within the base and configured to translate rotational motion of the shaft into the sliding motion of the first and second pins. The one or more translation components can include a gear coupled to the shaft, a first pin carrier coupled to the gear and to the first pin, and a second pin carrier coupled to the gear and to the second pin. In some arrangements the shaft can be configured to be manually rotated to slide the first and second pins to the engaging position and to slide the first and second pins to the gripping position. In some arrangements the shaft can be configured to be rotated automatically by a separate actuating component to slide the first and second pins to the engaging position and to slide the first and second pins to the gripping position.

In still further embodiments of the present disclosure, a dental model gripper can include a base, a shaft, a spring, a lever, a gear, a plate, first and second vertically oriented pins, and first and second pin carriers. The base can include a top side, a bottom side, a central opening at the bottom side, and first and second recesses formed therein. The shaft can define a longitudinal vertical axis and can extend longitudinally into the central opening of the base. The shaft can be configured to be rotated along its vertical axis in frontwards and backwards directions. The spring can be coupled to the shaft beneath the base and can be configured to bias the shaft toward a fully backwards rotational position. The lever can be coupled to the shaft beneath the base and can extend from the shaft in a non-parallel direction to the vertical axis. The lever can be configured to rotate the shaft to a fully frontwards rotational position. The gear can have gear teeth and can be coupled to the shaft within the base. The gear can be configured to rotate with the shaft about the vertical axis. The plate can be coupled to the top side of the base and can have a flat upper surface and first and second slotted openings therethrough. The first and second slotted openings can be oriented along a single straight line. The first and second vertically oriented pins can extend through the first and second slotted openings of the plate. Each of the first and second vertically oriented pins can have a pin head with a diameter that is greater than the diameter of its pin. Each pin head can be configured to pass vertically through a vertical opening along a bottom surface of a separate dental model. The first and second pin carriers can be located within the first and second recesses within the base. Each of the first and second pin carriers can be coupled to a respective one of the first and second vertically oriented pins and can have a toothed portion that engages the gear teeth. Each of the first and second pin carriers can be configured to reside at a default position with its respective pin at a maximum distance away from the vertical axis when the shaft is biased toward the backwards rotational position by the spring and to slide in a direction orthogonal to the vertical axis so that its respective pin moves to a fully actuated position with its respective pin at a minimum distance away from the vertical axis when the lever rotates the shaft to the fully frontwards rotational position. In various detailed embodiments, the vertical openings along the bottom surface of the separate dental model can conform to a standardized gripping geometry. The dental model gripper can be configured to grip other dental models having a bottom surface that conforms to the standardized gripping geometry.

Other apparatuses, methods, features, and advantages of the disclosure will be or will become apparent to one with skill in the art upon examination of the following figures and detailed description. It is intended that all such additional apparatuses, methods, features and advantages be included within this description, be within the scope of the disclosure, and be protected by the accompanying claims.

BRIEF DESCRIPTION OF THE DRAWINGS

The included drawings are for illustrative purposes and serve only to provide examples of possible structures and arrangements for the disclosed apparatuses, systems and methods for dental model gripping systems. These drawings in no way limit any changes in form and detail that may be made to the disclosure by one skilled in the art without departing from the spirit and scope of the disclosure.

DETAILED DESCRIPTION

Exemplary applications of apparatuses, systems, and methods according to the present disclosure are described in this section. These examples are being provided solely to add context and aid in the understanding of the disclosure. It will thus be apparent to one skilled in the art that the present disclosure may be practiced without some or all of these specific details provided herein. In some instances, well known process steps have not been described in detail in order to avoid unnecessarily obscuring the present disclosure. Other applications are possible, such that the following examples should not be taken as limiting. In the following detailed description, references are made to the accompanying drawings, which form a part of the description and in which are shown, by way of illustration, specific embodiments of the present disclosure. Although these embodiments are described in sufficient detail to enable one skilled in the art to practice the disclosure, it is understood that these examples are not limiting, such that other embodiments may be used, and changes may be made without departing from the spirit and scope of the disclosure.

The present disclosure relates in various embodiments to features, apparatuses, systems, and methods for dental model gripping systems. The disclosed embodiments can allow for the consistent and accurate handling of dental models during automated processing, especially with respect to the rapid mounting, gripping, and release of the dental models. In particular, the disclosed embodiments can utilize improved dental model gripping solutions that involve a standardized gripping geometry at the bottom of system compliant dental models as well as a dental model gripper that can quickly and accurately, grip, hold, and release any dental model using the standardized gripping geometry.

Although various embodiments disclosed herein discuss two pin to two opening gripping arrangements and dental model grippers having rotating shafts and gearbox bases, it will be readily appreciated that the disclosed features, apparatuses, systems, and methods can similarly be used for other dental model gripping systems having alternative part arrangements. For example, three or more pin and opening gripping arrangements can be used, and other part mechanisms can be used to manipulate the pins to different useful positions. Other applications, arrangements, and extrapolations beyond the illustrated embodiments are also contemplated.

Figure 1:
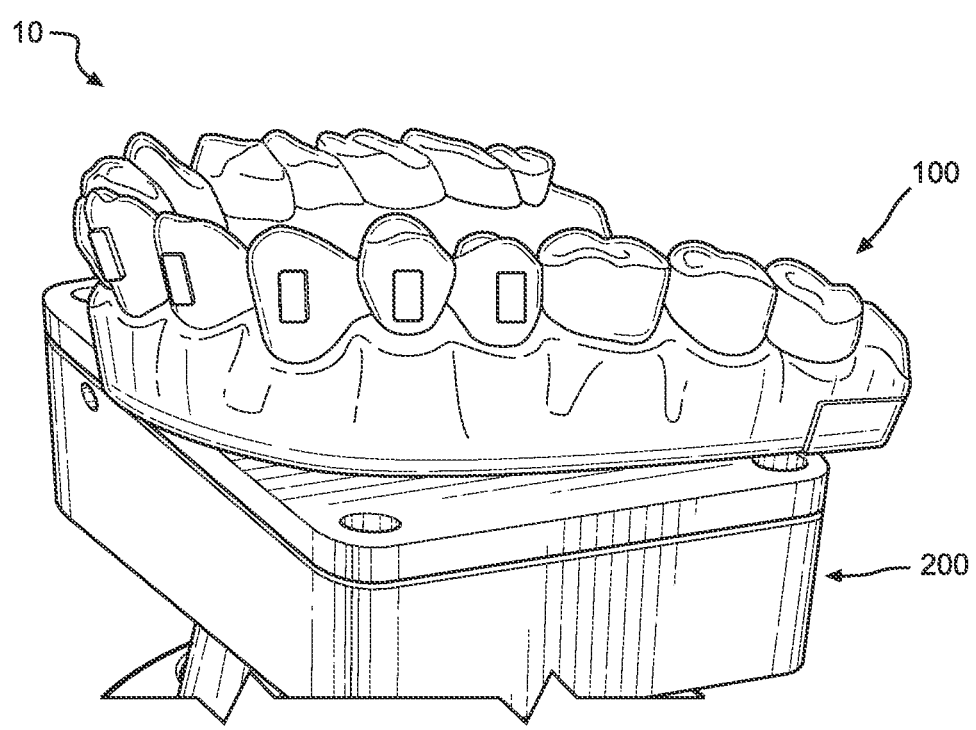
FIG. 1 illustrates in side perspective view an example dental model gripping system according to one embodiment of the present disclosure.

Referring first to FIG. 1, an example dental model gripping system is illustrated in side perspective view. Dental model gripping system 10 can include a dental model 100 and a dental model gripper 200. Dental model 100, which can be 3D printed, injection molded, or formed by any other suitable means, can include an upper region with a replica set of teeth and a lower region coupled to the upper region. The replica set of teeth can have the same size and shape as the teeth of a human patient, and the upper region can be integrally formed with the lower region. The lower region of dental model 100 can include a horizontal, substantially flat bottom surface and a gripping geometry that is configured to interface with a gripping geometry of dental model gripper 200, as detailed below. In various embodiments, the gripping geometry of dental model 100 can conform to a standardized gripping geometry that can be used by many different similar dental models, where every dental model that conforms to the standardized gripping geometry can be readily gripped by dental model gripper 200.

Dental model gripper 200 can similarly include a horizontal, substantially flat top surface and a gripping geometry that is configured to interface with the gripping geometry of dental model 100, as also detailed below. Dental model gripper 200 can also include one or more features that allow it to be firmly mounted to larger and more stable system components such that the dental model gripper can be rendered reliably stable and immovable as desired. When properly placed together as shown, dental model 100 can be gripped by (i.e., mounted to) dental model gripper 200 such that the dental model can in turn be rendered as reliably stable and immovable. This can facilitate the consistent and accurate handling of dental model 100 during various types of automated processing, such as replica tooth formation, milling, polishing, aligner formation, and the like. The way that dental model 100 is gripped by or mounted to dental model gripper 200 can facilitate the rapid mounting and release of the dental model to the dental model gripper for added speed and convenience, as also detailed below.

In various embodiments, multiple additional dental models having the same or similar features as depicted dental model 100 can be part of dental model gripping system 10. For example, a second dental model having a similar upper region, lower region, and gripping geometry can be used. Such a second dental model can have a different replica set of teeth and can have a similar but different gripping geometry. The different replica set of teeth can model those of a different dental or orthodontic patient while the similar but different gripping geometry can still conform to the standardized gripping geometry. Further system compatible dental models with different teeth replicas and similar but different gripping geometries that still conform to the standardized gripping geometry can also be included in system 10.

Figure 2A:
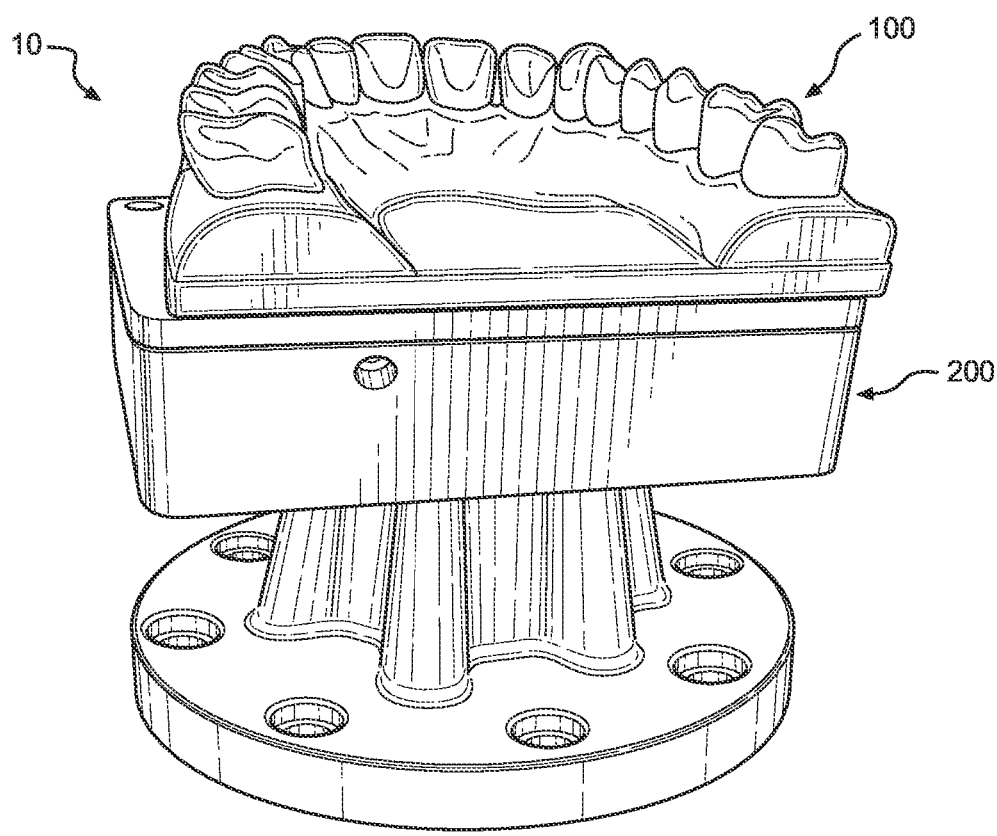
FIG. 2A illustrates in rear perspective view the dental model gripping system of FIG. 1 according to one embodiment of the present disclosure.
Figure 2B:
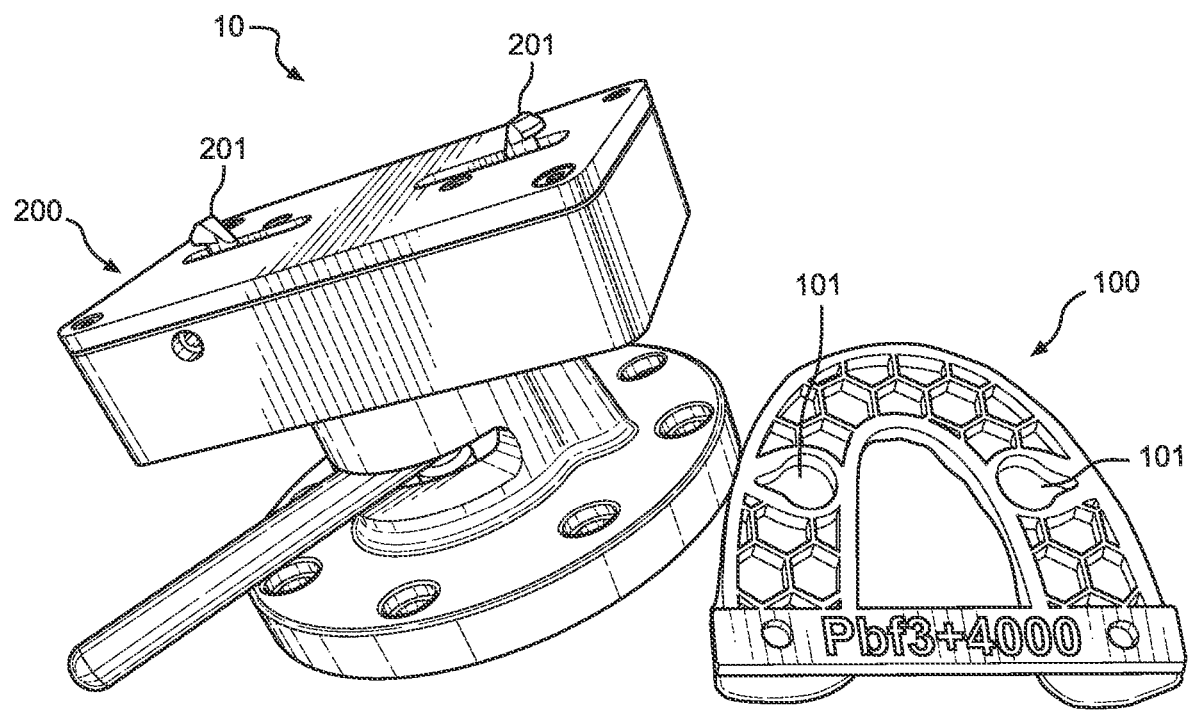
FIG. 2B illustrates in front perspective view the dental model gripping system of FIG. 1 with its dental model separated from its dental model gripper according to one embodiment of the present disclosure.

Continuing with FIGS. 2A and 2B, the dental model gripping system of FIG. 1 is shown in rear perspective view assembled and in front perspective view with its dental model separated from its dental model gripper. FIG. 2A simply depicts a different perspective of the same assembled arrangement of dental model gripping system 10 shown in FIG. 1. FIG. 2B shows dental model gripping system 10 with dental model 100 having been removed from dental model gripper 200, however, such that the substantially flat surfaces and gripping geometries of both the dental model and dental model gripping system are exposed.

The gripping geometry of dental model 100 can include multiple vertical openings 101 through its bottom surface. Vertical openings 101, which can be exactly two vertical openings as shown in FIG. 2B, can be configured to interact with the gripping geometry of dental model gripper 200 and can be spaced apart a set distance along a line perpendicular to a line of symmetry for dental model 100. The gripping geometry of dental model gripper 200 can include multiple vertically oriented pins 201 extending from a top surface of the dental model gripper. Each of pins 201, which can be exactly two pins as shown in FIG. 2B, can be configured to pass through a corresponding vertical opening 101 of dental model 100. Pins 201 can be configured to move toward and away from each other, which can facilitate the mounting and removal of dental model 100 onto dental model gripper 200 by way of inserting the pins into and moving them within the vertical openings 101.

Figure 3A:
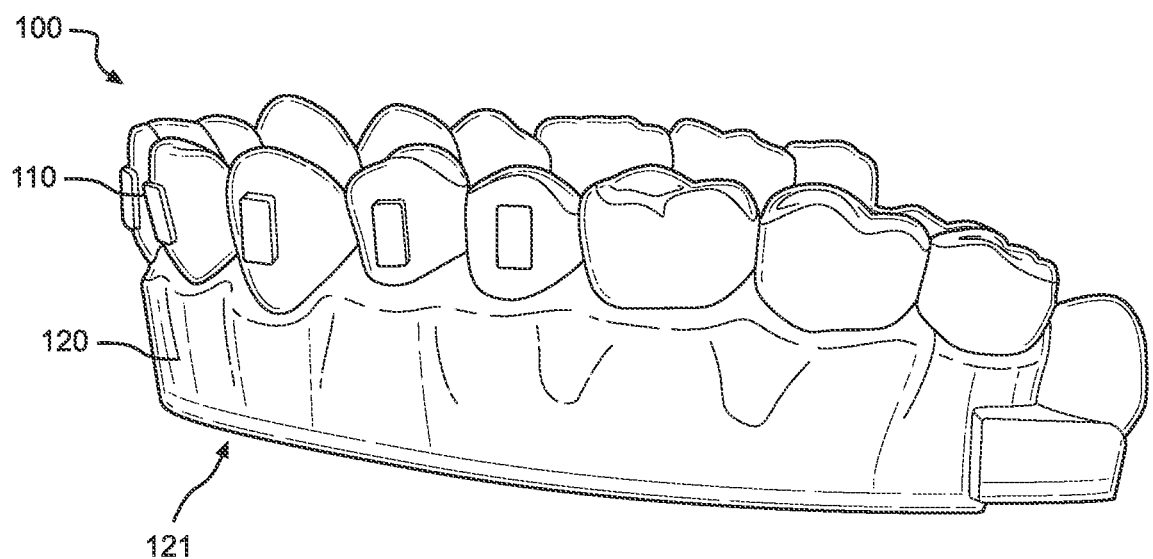
FIG. 3A illustrates in side perspective view an example dental model for use in a dental model gripping system according to one embodiment of the present disclosure.
Figure 3B:
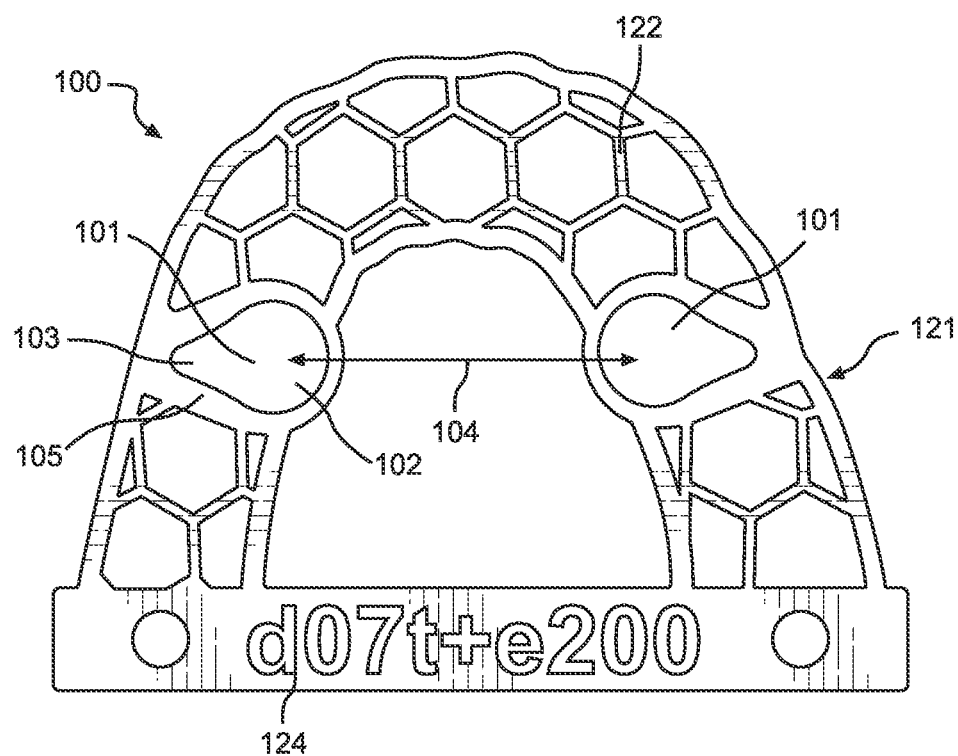
FIG. 3B illustrates in bottom plan view the dental model of FIG. 3A according to one embodiment of the present disclosure.

Moving next to FIGS. 3A and 3B, an example dental model for use in a dental model gripping system is illustrated in side perspective and bottom plan views respectively. Again, dental model 100 can include an upper region 110 with a replica set of teeth and a lower region 120 coupled to (e.g., integrally formed with) the upper region. The lower region 120 can include a horizontal bottom surface 121 having one or more flat areas, which can include flat bottom regions of an internal honeycomb structure 122 within dental model 100, a stabilizing bar 124 across the back end of the dental model, and flat bottom regions of internal walls surrounding vertical openings 101, for example. Both vertical openings 101 can each include an enlarged region 102 configured to accept a pin of the dental model gripper and a narrower slotted region 103 extending away from the enlarged region in a direction opposite the other vertical opening.

Vertical openings 101 can be spaced apart by an opening distance 104. Due to the different mouth and tooth sizes of different patients, the sizes of different dental models can vary such that opening distance 104 can vary from one dental model to another. Given the moving nature of the pins in the dental model gripper, however, different dental models having different sizes and different opening distances 104 between their vertical openings 101 can all still conform to a standardized gripping geometry to be compatible with the dental model gripper. Each vertical opening 101 can include a lip 105 that prevents the pin head of a dental model gripper pin from passing back through the opening after it has passed through the enlarged region 102 and traveled into the narrower region 103.

Figure 4A:
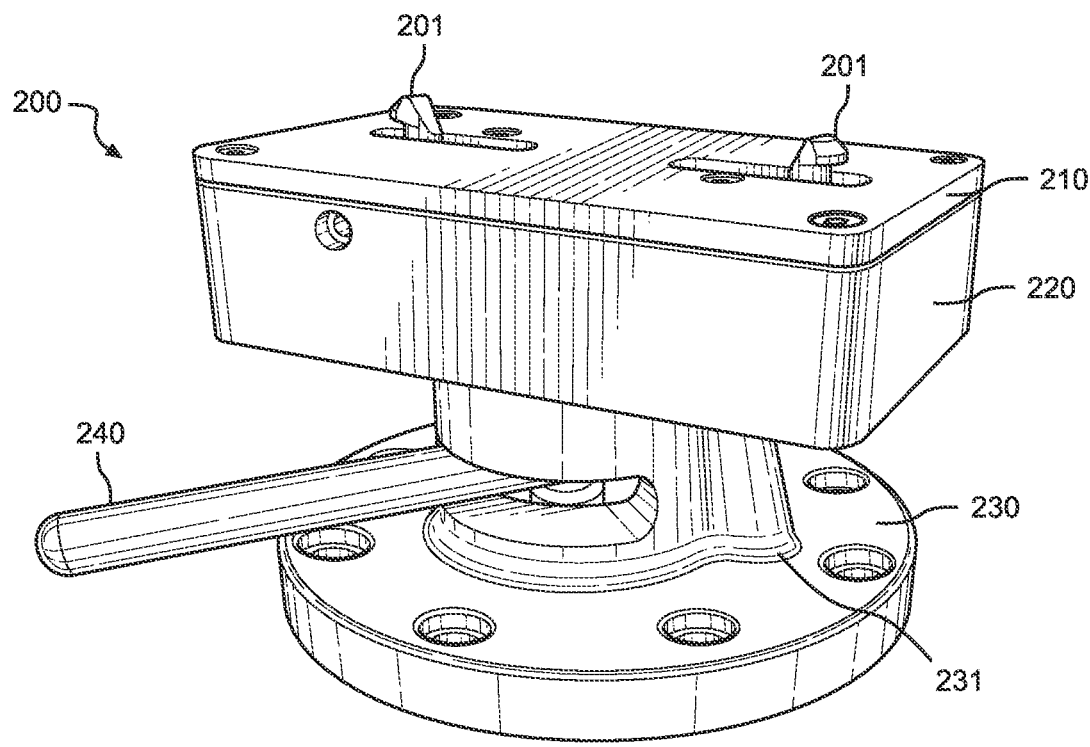
FIG. 4A illustrates in front perspective view an example dental model gripper for a dental model gripping system according to one embodiment of the present disclosure.
Figure 4B:
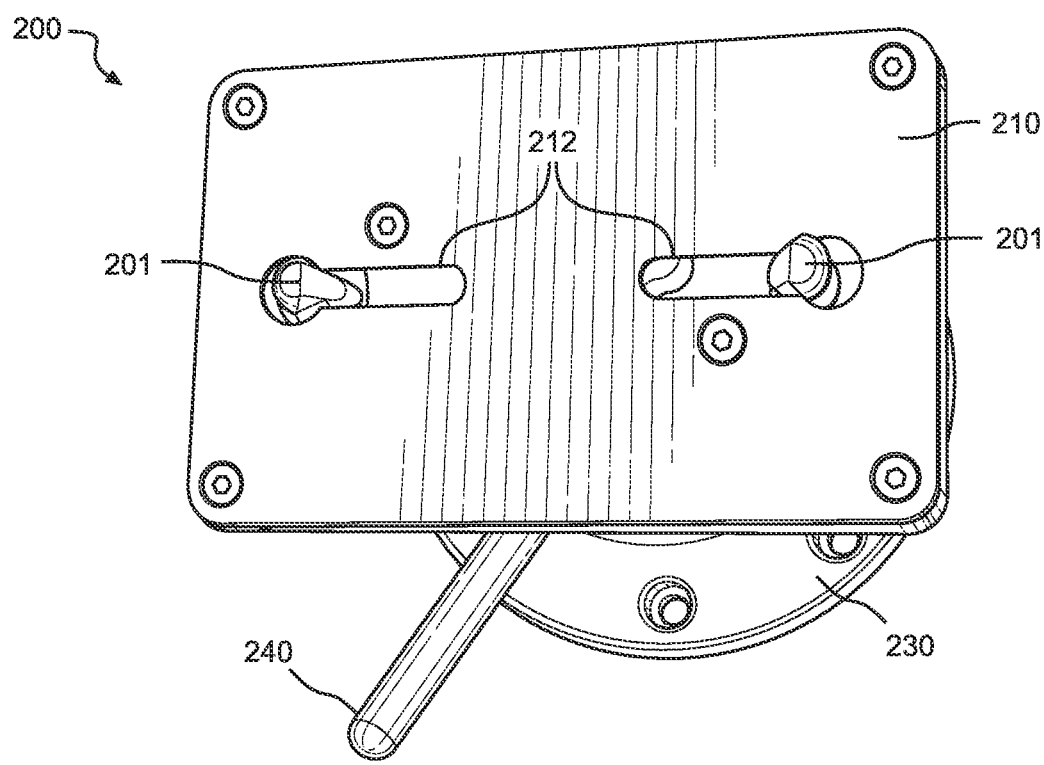
FIG. 4B illustrates in top perspective view the dental model gripper of FIG. 4A according to one embodiment of the present disclosure.

Continuing with FIGS. 4A and 4B, an example dental model gripper for a dental model gripping system is depicted in front perspective and top perspective views respectively. In addition to vertically oriented pins 201, dental model gripper 200 can also include a plate 210 located atop a base 220, a support bracket 230, and a lever 240 extending from a lever opening 231 in the support bracket. Plate 210 can have slotted openings 212 therethrough arranged in a straight line, as shown. In various arrangements, pins 201 can be configured to travel toward and away from each other simultaneously along slotted openings 212. Such pin travel can be facilitated by manual operation of lever 240 back and forth within lever opening 231.

Figure 5A:
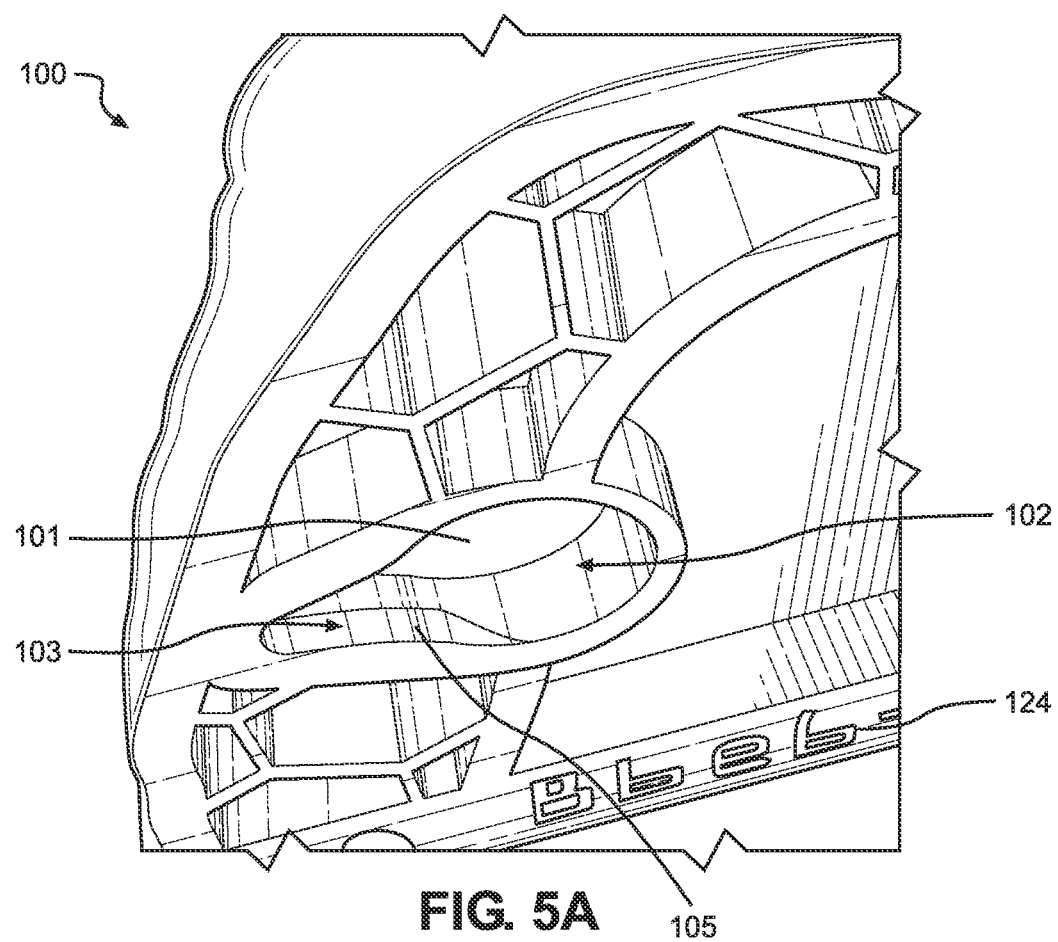
FIG. 5A illustrates in bottom perspective view an example gripping geometry of a dental model for a dental model gripping system according to one embodiment of the present disclosure.

Referring next to FIG. 5A an example gripping geometry of a dental model for a dental model gripping system is shown in bottom perspective view. Again, dental model 100 can include a stabilizing bar 124 across its bottom flat surface, as well as multiple vertical openings 101. Each vertical opening 101 can include an enlarged region 102 configured to accept a pin of the dental model gripper and a narrower slotted region 103 extending away from the enlarged region in a direction opposite the other vertical opening. In some arrangements, the enlarged region 102 and narrower slotted region 103 can form a teardrop shape, and in other arrangements these features can form an elongated slot with the enlarged opening at one end. In any such arrangement, vertical opening 101 can include a lip 105 that prevents the pin head of a dental model gripper pin from passing back through the opening after it has passed through the enlarged region 102 and traveled into the narrower region 103.

Figure 5B:
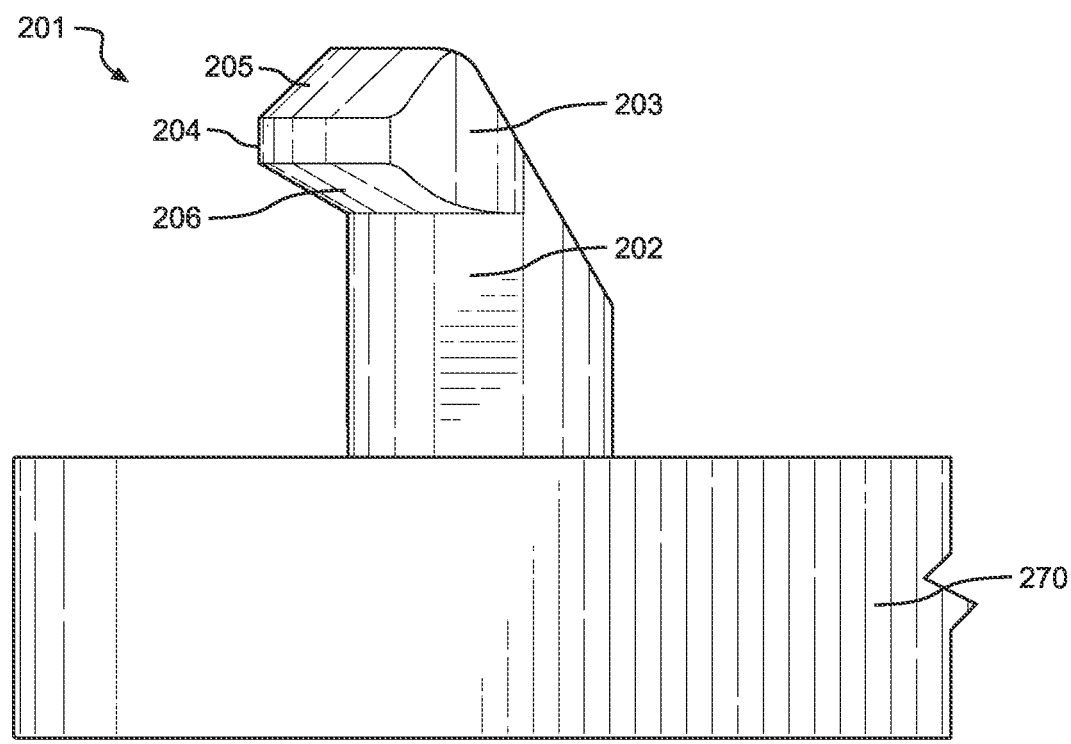
FIG. 5B illustrates in side perspective view an example gripping geometry of a pin of a dental model gripper for a dental model gripping system according to one embodiment of the present disclosure.

FIG. 5B illustrates in side perspective view an example gripping geometry of a pin of a dental model gripper for a dental model gripping system. Pin 201, which can be coupled to and vertically extend from pin carrier 270, can have a vertically oriented pin shaft 202 and a pin head 203 with a diameter that is greater than the diameter of its pin shaft. Pin head can 203 be configured to pass vertically through an enlarged region 102 of a corresponding vertical opening 101 of a dental model. After passing through the enlarged region 102, the pin 201 can then travel down into the narrower region 103 of the vertical opening 101 such that its pin head 203 cannot vertically pass back through the vertical opening. Rather, a widest portion 204 of pin head 203 can remain above the lip 105 of the vertical opening 101.

In various arrangements, portions of pin head 203 can be tapered to facilitate a better fit and greater surface to surface contact within the narrower region 103 of vertical opening 101. For example, pin head 203 can include an upper tapered region 205 and lower tapered region 206, both of which can extend to widest portion 204 of the pin head. Similarly, internal portions within the narrower region 103 of vertical opening 101 can be tapered to facilitate a better fit and greater surface to surface contact with pin head 203 as the pin head is slid deep into the narrower region. Such better fits and greater surface to surface contact between pin head 203 and the internal portions within the narrower region 103 can facilitate a better gripping between the dental model and dental model gripper, as detailed below.

Figure 5C:
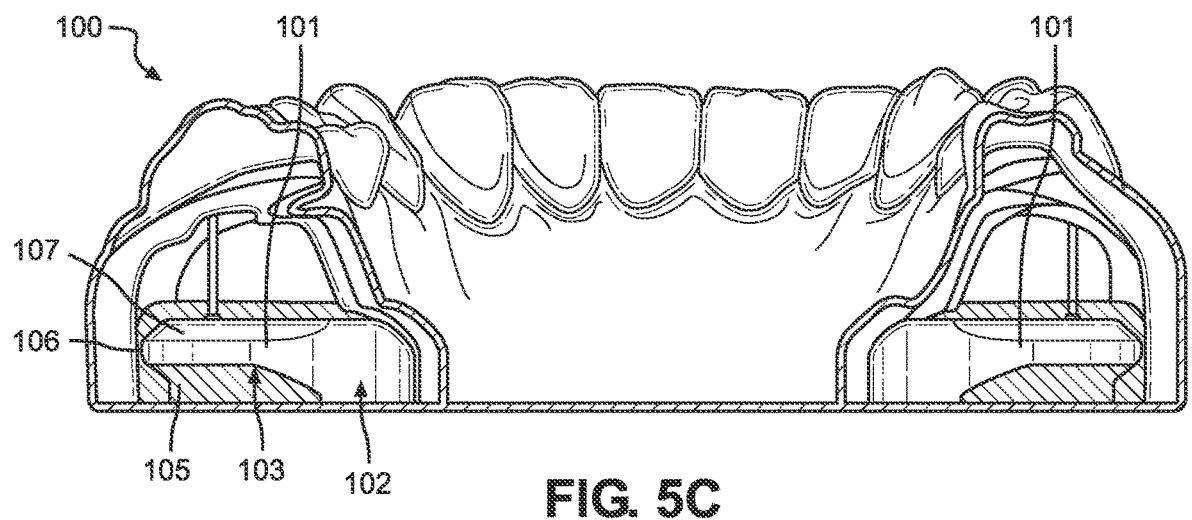
FIG. 5C illustrates in side cross-section view an example gripping geometry of a dental model for a dental model gripping system according to one embodiment of the present disclosure.

Continuing with FIG. 5C, an example gripping geometry of a dental model for a dental model gripping system is illustrated in side cross-section view. Again, dental model 100 can include multiple vertical openings 101, each of which can include an enlarged region 102 configured to accept a pin of a dental model gripper and a narrower slotted region 103 that is effectively narrowed by way of a lip 105. In various arrangements, the internal cavity above the narrower slotted region 103 can be of the same or similar size as the internal cavity above the enlarged region 102, with lip 105 functioning to block an inserted pin head from being removed from the narrower slotted region. In effect, a pin head can be inserted into and removed from vertical opening 101 only through enlarged region 102, but not through slotted region 103, due to lip 105. Slotted region 103 can also include one or more tapered regions, such as a lower tapered region 106 above lip 105 and an upper tapered region 107 at the top of vertical opening 101. Tapered regions 106, 107 can define part of a gripping geometry for vertical opening 101 and can be arranged to effectively lessen or narrow the height of the vertical opening as it extends away from enlarged region 102.

Figure 5D:
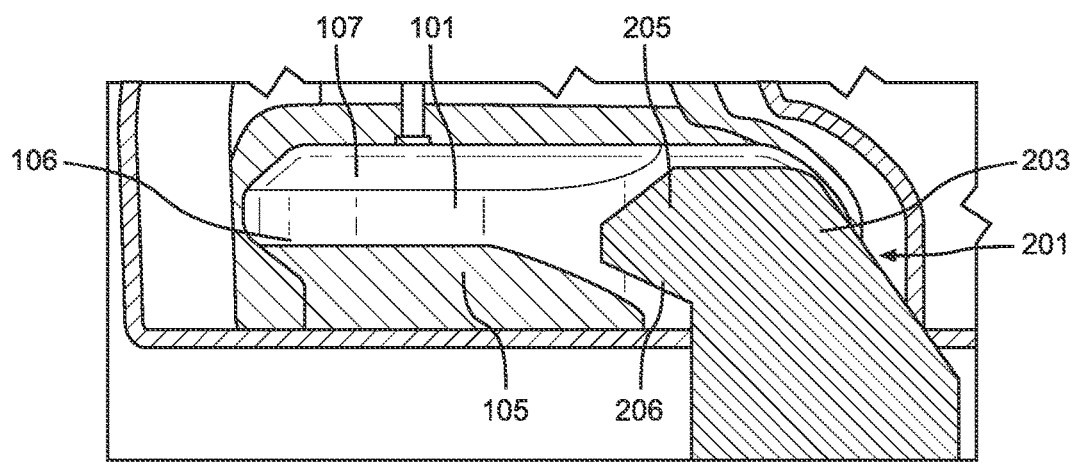
FIG. 5D illustrates in side cross-section view an example pin of a dental model gripping system entering an opening in the dental model gripping geometry of FIG. 5C according to one embodiment of the present disclosure.
Figure 5E:
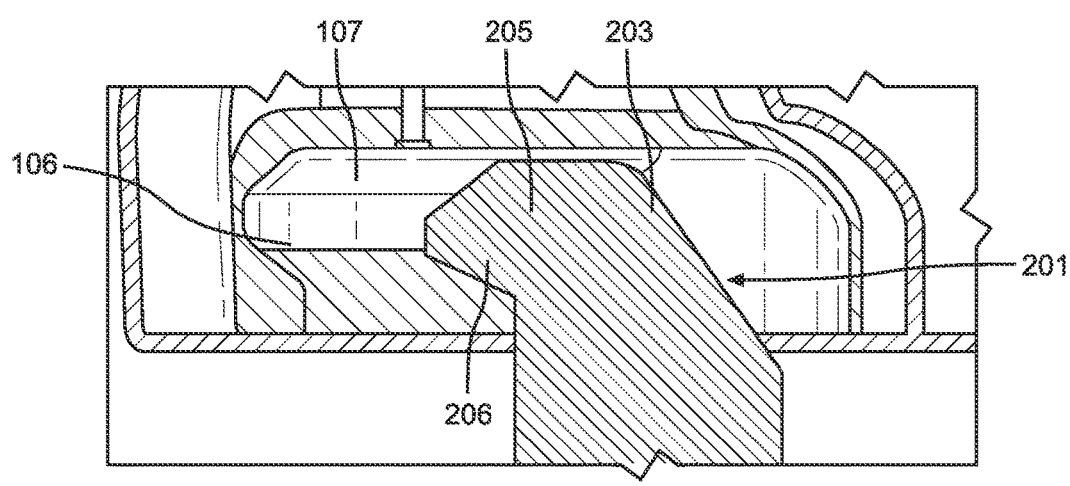
FIG. 5E illustrates in side cross-section view the dental model gripping system pin locking into the dental model opening gripping geometry of FIG. 5D according to one embodiment of the present disclosure.

Moving to FIG. 5D, an example pin of a dental model gripping system entering an opening in the dental model gripping geometry of FIG. 5C is similarly shown in side cross-section view. As shown, pin 201 is entering vertical opening 101 through its enlarged region 102 since this is the only portion of the vertical opening that is large enough to accept the full width of pin head 203. Next, FIG. 5E depicts in side cross-section view the dental model gripping system pin locking into the dental model opening gripping geometry. As shown, pin 201 can slide laterally from its initial position upon insertion into the vertical opening to a position where pin head 203 is too large to be withdrawn from the vertical opening, due to lip 105.

Sliding within vertical opening 101 in a lateral direction can continue until upper tapered region 205 of pin head 203 contacts upper tapered region 107 of vertical opening 101 and lower tapered region 206 of the pin head contacts lower tapered region 106 of the vertical opening. It will be readily appreciated that a substantially similar interaction can occur at the opposing vertical opening of the dental model with the opposing pin head of the dental model gripping system. It will also be understood that the spring bias on the pins can force them in the directions shown until they are gripped within the dental model due to the interactions and gripping of these various tapered regions. These gripping geometry features can ensure the repeatable seating of various dental models of varying sizes on the dental model gripper. Slight misorientations, askew models, and irregularities in dental models and/or dental model grippers can be accounted for by the nature of this gripping arrangement, as will be readily appreciated.

Figure 6A:
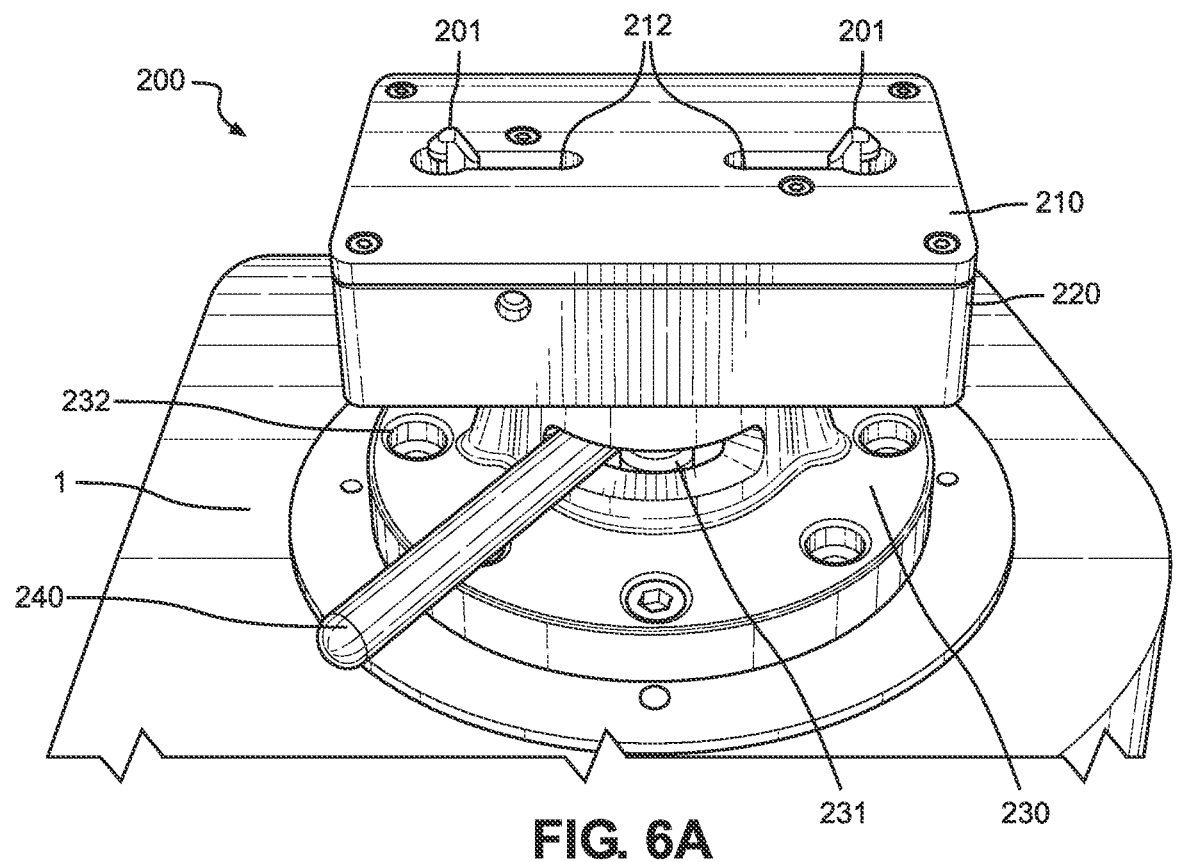
FIG. 6A illustrates in front perspective view an example dental model gripper with its pins at a default position according to one embodiment of the present disclosure.
Figure 6B:
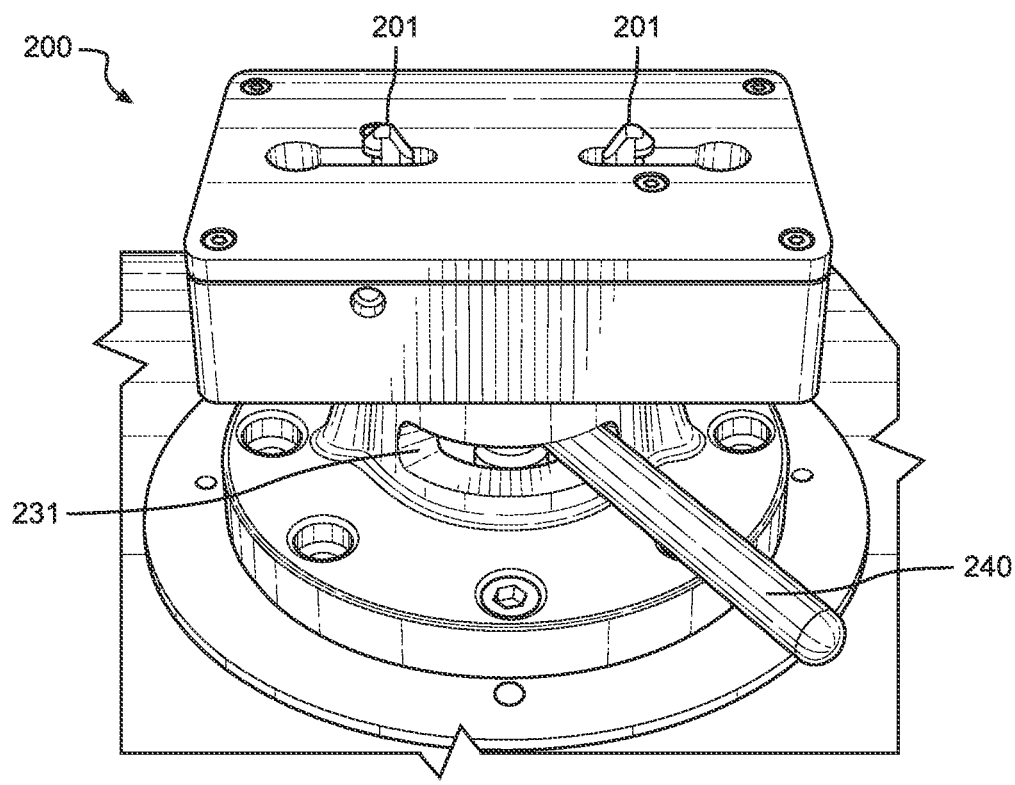
FIG. 6B illustrates in front perspective view the dental model gripper of FIG. 6A with its pins at a fully actuated position according to one embodiment of the present disclosure.

Transitioning now to FIGS. 6A and 6B an example dental model gripper is shown in front perspective views first with its pins at a default position and then with its pins at a fully actuated position. As noted above, dental model gripper 200 can be firmly mounted to a larger and more stable system component 1 such that the dental model gripper can be rendered reliably stable and immovable. Such a mounting can be accomplished by way of one or more screws, bolts, or other fasteners placed through mounting holes 232 in support bracket 230, for example.

As shown at its default position in FIG. 6A, dental model gripper 200 can have its pins 201 spaced as far apart as possible within slotted openings 212 of plate 210 sitting atop base 220. In various embodiments, pins 201 can be spring loaded directly or indirectly such that these pins are forced as far apart as possible along slotted openings 212. Lever 240, which can protrude from lever opening 231 in support bracket 230, can be manually actuated from one side of the lever opening towards the other side in order to overcome the spring bias and to move pins 201 closer together.

As shown at its fully actuated position in FIG. 6B, dental model gripper 200 can have its pins 201 moved together as close as possible within slotted openings 212. This can be accomplished by fully actuating lever 240 from one side of lever opening 231 to the other side of the lever opening. In addition, lever 240 can be partially actuated by any amount desired to move pins 201 to any location along slotted openings 212 between their extremes of default and fully actuated positions. Such easy variable positioning of pins 201 can facilitate the ready mounting and removal of different dental models from dental model gripper 200 regardless of the varying opening spacings between different dental models, as will be readily appreciated.

It will also be readily appreciated that a variety of internal components and arrangements within a dental model gripper can be used to facilitate the disclosed movements of pins 201 at an upper surface of the dental model gripper. It will be understood that any suitable arrangement of internal components can be used for this purpose, and the following non-limiting example is provided for purposes of illustration.

Figure 7:
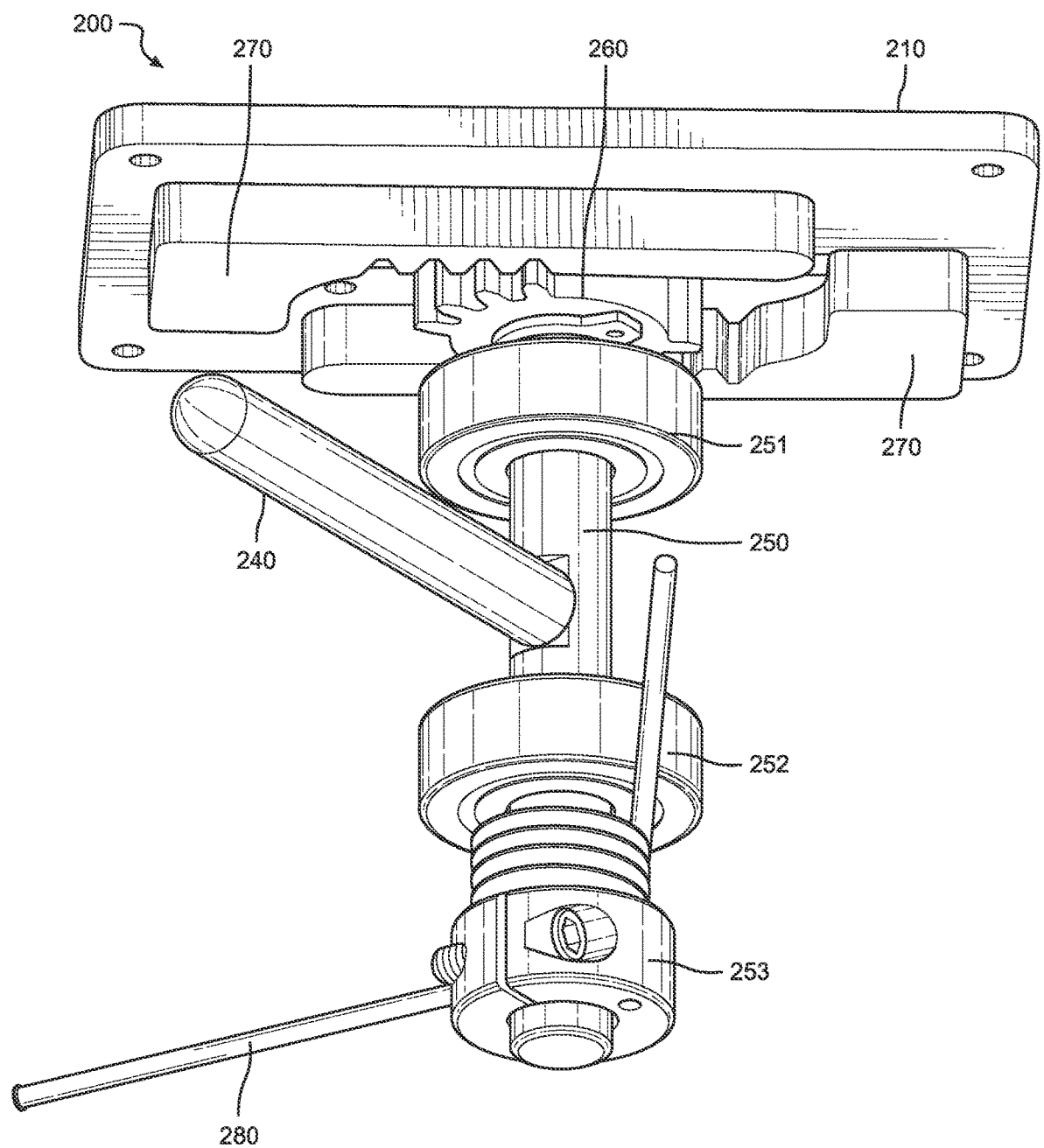
FIG. 7 illustrates in front perspective view example internal components of a dental model gripper according to one embodiment of the present disclosure.

Accordingly, FIG. 7 illustrates example internal components of a dental model gripper in front perspective view.

Dental model gripper 200 can again include a plate 210 along a top surface thereof, movable pins (not shown in FIG. 7) above the plate, and a lever 240 configured to manually actuate the movable pins. In some arrangements, lever 240 can be coupled to a shaft 250 that extends longitudinally into the base (not shown in FIG. 7) of the dental model gripper 200. Shaft 250 can define a longitudinal vertical axis and can be configured to be rotated along its vertical axis in frontwards and backwards directions. Rotational bearings 251, 252 can keep shaft centrally positioned and supported within the base and support bracket (not shown in FIG. 7). Shaft 250 can be biased by spring 280, which can be a torsion spring. Shaft collar 253 can be attached to shaft 250 at a bottom end of the shaft and can be configured to keep spring 280 from sliding off the shaft.

Gear 260, which can be a spur gear, can be coupled to shaft 250 proximate a top end of the shaft located just beneath plate 210. Gear can rotate about the vertical axis in either direction with shaft 250 when the shaft rotates about the vertical axis in either direction. First and second pin carriers 270 can be positioned beneath plate 210, and each of these pin carriers can be coupled to a respective pin that extends through a slotted opening (not shown in FIG. 7) in plate 210. In some arrangements, each pin carrier 270 can be integrally formed with its respective pin. Each pin carrier 270 can have a toothed region configured to interact with the teeth of gear 260, such that each pin carrier is driven laterally along a bottom surface of plate 210 when gear 260 rotates. This lateral movement of pin carriers 270 then results in the movement of their respective pins.

Figure 8A:
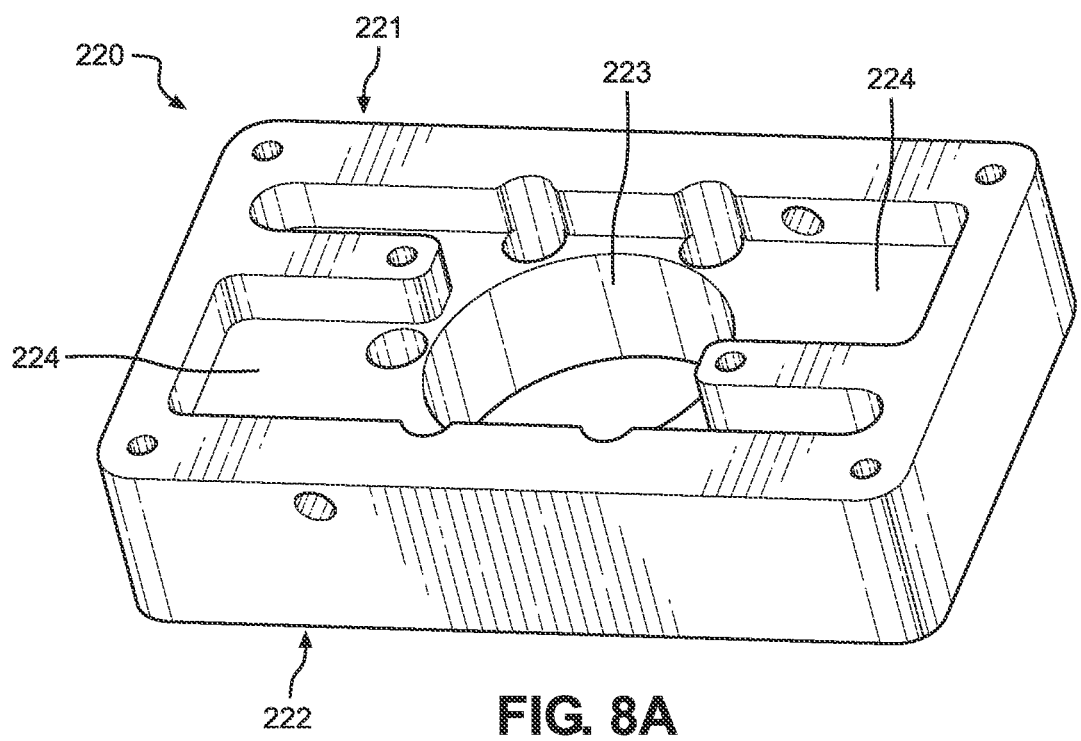
FIG. 8A illustrates in front perspective view an example base of a dental model gripper according to one embodiment of the present disclosure.

Moving next to FIG. 8A, an example base of a dental model gripper is shown in front perspective view. Base 220 can generally include a top side 221, a bottom side 222, a central opening 223 at the bottom side, and first and second recesses 224 formed therein. In some arrangements, first and second recesses 224 can be sized, shaped, and located within base 220 to support pin carriers that are coupled to pins extending above base 220, where each pin carrier is configured to slide laterally back and forth within its respective recess.

Figure 8B:
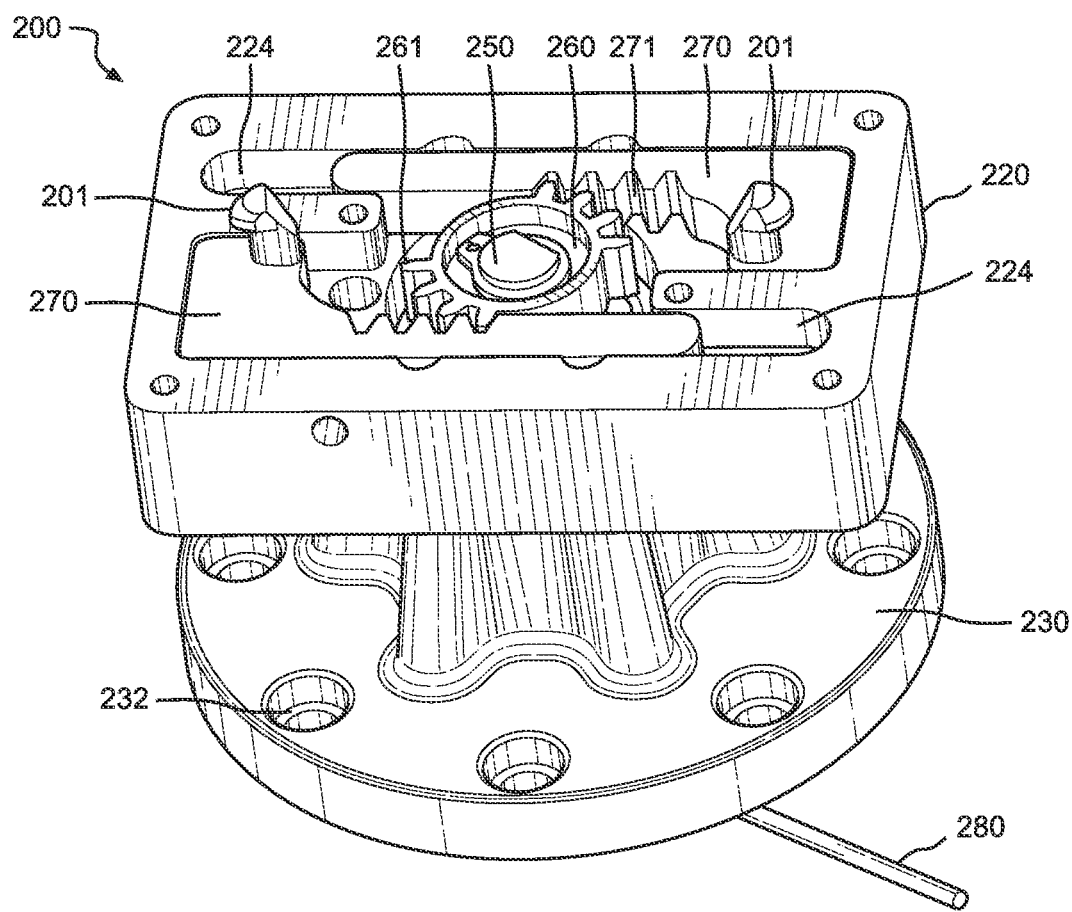
FIG. 8B illustrates in front perspective view an example dental model gripper with its top plate removed according to one embodiment of the present disclosure.

This can be seen in FIG. 8B, which illustrates in front perspective view an example dental model gripper with its top plate removed. Again, dental model gripper 200 can have a base 220 situated above a support bracket 230. A shaft 250 can extend up into base 220 through a central opening therein, and a gear 260 can be coupled to shaft 250 proximate its top end such that the gear can rotate frontwards and backwards with the shaft when the shaft rotates. First and second pin carriers 270 can be located within first and second recesses 224 within base 220, and each pin carrier can be coupled to a respective vertically oriented pin 201 that extends upward out of housing 220 (and through a slotted opening of the plate above the housing when the plate is present). Each pin carrier 270 can have a toothed portion 271 that engages teeth 261 of gear 260, such that both pin carriers 270 (and their coupled pins 201) slide laterally simultaneously in opposite directions when shaft 250 and gear 260 rotate.

As can be extrapolated from the foregoing illustrations and description, each of the first and second pin carriers 270 can be configured to reside at a default position with its respective pin 201 at a maximum distance away from the vertical axis of rotation for shaft 250 when the shaft is biased toward a backwards rotational position by spring 280, and to slide in a direction orthogonal to the vertical axis so that its respective pin 201 moves to a fully actuated position with its respective pin at a minimum distance away from the vertical axis when the shaft is rotated (e.g., by the lever) to a fully frontwards rotational position.

Figure 9:
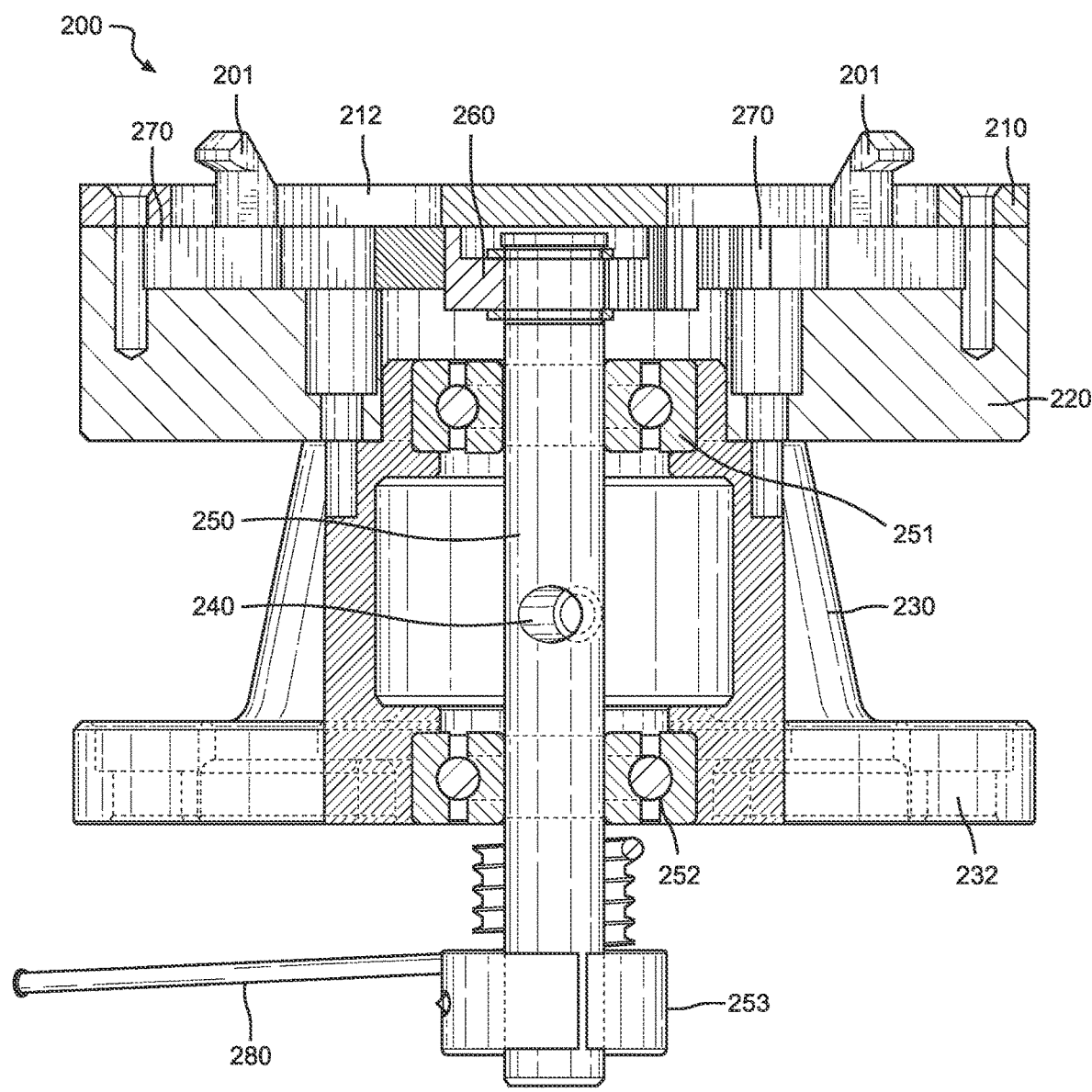
FIG. 9 illustrates in side cross-section view an example dental model gripper for a dental model gripping system according to one embodiment of the present disclosure.

Continuing with FIG. 9 an example dental model gripper for a dental model gripping system is shown in side cross-section view. FIG. 9 presents additional perspective for the various components of dental model gripper 200 illustrated and described in detail above. Again, such dental model gripper components can include a top plate 210 situated above a base 220 that is in turn situated above a support bracket 230. A shaft 250 can extend through a central opening at the bottom of base 220, and the shaft can be rotated in frontwards and backwards directions about a longitudinal vertical axis through the shaft. First and second rotational bearings 251, 252 can keep shaft 250 centrally positioned and supported within base 220 and support bracket 230. Torsion spring 280 can be coupled to shaft 250 beneath base 220 and this spring can be configured to bias the shaft toward a fully backwards rotational position. Shaft collar 253 can be attached to shaft 250 at a bottom end and can keep torsion spring 280 from sliding off the shaft.

Spur gear 260 can be coupled to a top end of shaft 250 and can rotate with the shaft. Rotation of gear 260 can drive pin carriers 270 simultaneously to move in lateral directions that are orthogonal to the vertical axis of shaft 250. Vertically oriented pins 201 can be coupled to and extend upward from pin carriers 270 such that they move with the pin carriers. These pins 201 can move back and forth along slotted openings 212 in plate 210. As detailed above, the simultaneous and coordinated movement of pins 201 can facilitate mounting, gripping, and release from corresponding vertical openings in an associated dental model.

In some arrangements, a lever 240 extending from shaft 250 can be used to manually actuate and control the movement and positioning of pins 201. Lever 240 can be coupled to shaft 250 beneath base 220, such as inside support bracket 230, and this lever can extend from the shaft in a non-parallel direction to the vertical axis of the shaft. Lever 240 can be configured to rotate shaft 250 to a fully frontwards rotational position by overcoming the spring bias that puts the shaft at a fully backwards rotational position by default. In some arrangements, the actuation and control of shaft 250 can be automated, such as by additional robotic components not shown in FIG. 9. In other arrangements, shaft can be actuated and controlled both manually by way of lever 240 and automatically by way of one or more additional robotic components. For example, a robotically controlled component can be coupled proximate a bottom end of shaft 250 to automatically rotate and control the shaft.

Figure 10A:
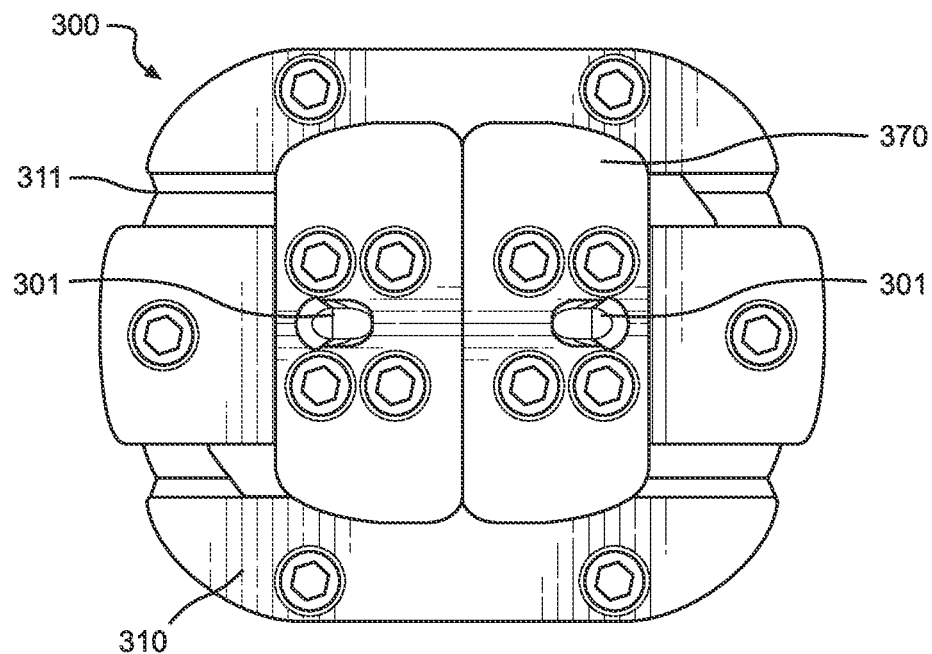
FIG. 10A illustrates in top plan view an example alternative dental model gripper with its pins at an engaging position according to one embodiment of the present disclosure.
Figure 10B:
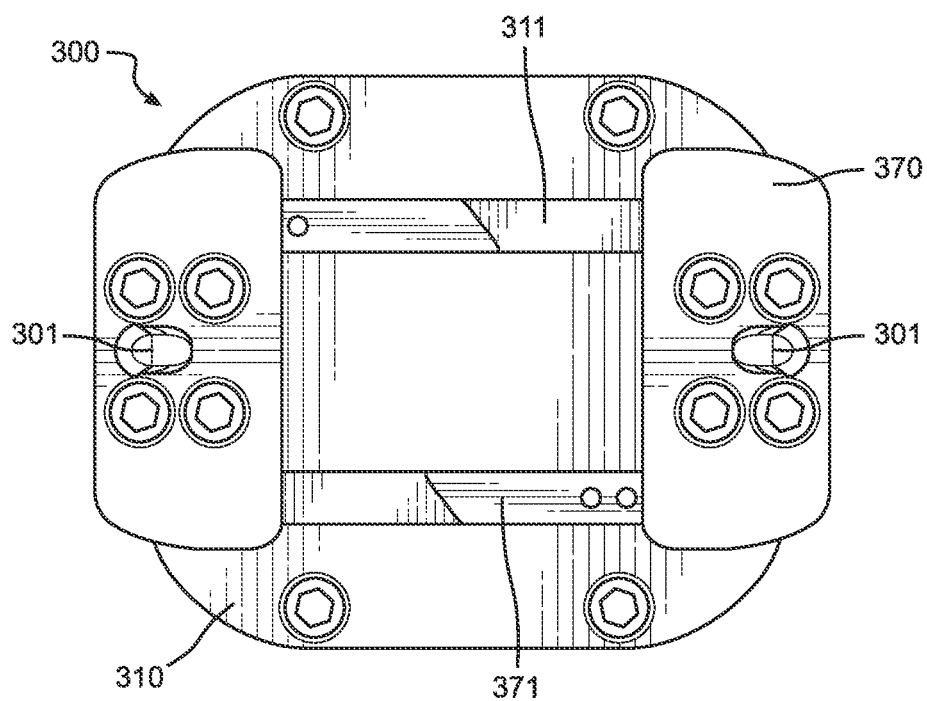
FIG. 10B illustrates in top plan view the alternative dental model gripper of FIG. 10A with its pins at a gripping position according to one embodiment of the present disclosure.

Lastly, FIGS. 10A and 10B illustrate in top plan views an example alternative dental model gripper first with its pins at an engaging position and then with its pins at a gripping position. Alternative dental model gripper 300 can be configured to interface with dental model 100 illustrated and described above, as well as other similar dental models that conform to a standardized gripping geometry. Alternative dental model gripper 300 can have substantially similar pins 301 extending vertically upward therefrom, and these pins can be configured to move toward and away from each other along a straight line in a manner that is similar to that for dental model gripper 200 as set forth above.

Each pin 301 can be integrally formed with or otherwise coupled to a pin carrier 370, and these pin carriers can be configured to move back and forth toward and away from each other simultaneously and in coordinated fashion, similar to pin carriers 270 above. Alternative dental gripper 300 can also include a top plate 310 about which pin carriers 370 move laterally. In some arrangements, pin carriers 370 can be coupled to sliding components 371 that slide within tracks 311 formed within top plate 310. Various internal components (not shown) within alternative dental gripper 300 can facilitate these movements, and such internal components can be similar to those illustrated and described above for dental model gripper 200. Other items, components, features, and arrangements can also be used, as will be readily appreciated. In some arrangements, actuation of pin carriers 370 can be manual, while in other arrangements such actuation can be automated, such as by one or more robotically controlled items.

While the various embodiments disclosed herein have illustrated and discussed specific embodiments having two pin to two opening gripping arrangements with both pins moving toward and away from each other in coordinated fashion, it will be readily appreciated that the disclosed features, apparatuses, systems, and methods can similarly be used for other dental model gripping systems having alternative arrangements of pins and other parts. For example, alternative embodiments can involve the use of two pins where one pin remains stationary while the other pin moves toward and away from the stationary pin. An alternative pin carrier and gear system can be adapted for such an alternative arrangement, as will be readily appreciated by one of skill in the art.

Such an arrangement involving one stationary pin and one moving pin can be configured, for example, using a single moving pin carrier for the moving pin and a nonmoving or no pin carrier for the stationary pin. Such a single moving pin system can also be used with the same or similar dental models with gripping geometries, since a single moving pin also facilitates an arrangement where there is relative movement between two pins to allow the pins to be inserted into enlarged regions of vertical openings on a dental model at a first position and then move relative to each other to a second position where the pins are unable to be removed from the vertical openings due to being at narrower regions of the vertical openings.

Other alternative embodiments are also possible. In other arrangements, for example, pin movements, vertical opening arrangements, and spring biases can all be reversed, such that pins can be inserted into dental models while the pins are far apart and then gripping occurs as the pins move closer together. Alternative arrangements can also include one or more additional pins and vertical openings. For example, a third vertical opening can be located at the front of the dental model at equal distances from the first two pins as shown. A third pin can be inserted into such a third vertical opening, and such a third pin may be stationary or may also move.

Although the foregoing disclosure has been described in detail by way of illustration and example for purposes of clarity and understanding, it will be recognized that the above described disclosure may be embodied in numerous other specific variations and embodiments without departing from the spirit or essential characteristics of the disclosure. Certain changes and modifications may be practiced, and it is understood that the disclosure is not to be limited by the foregoing details, but rather is to be defined by the scope of the appended claims.

What is claimed is:

1. A dental model gripping system, comprising:
    a first dental model including:
        a first upper region including a first replica set of teeth,
        a first lower region coupled to the first upper region, the first lower region including a horizontal bottom surface having one or more flat areas, and
        a first gripping geometry positioned along the bottom surface, the first gripping geometry including first and second vertical openings through the bottom surface and spaced apart by a first opening distance, wherein each of the first and second vertical openings includes an enlarged region and a narrower region extending away from the enlarged region in a direction opposite the other vertical opening; and
    a dental model gripper including:
        a base including a top side, a bottom side, a central opening at the bottom side, and first and second recesses formed therein,
        a shaft defining a longitudinal vertical axis, the shaft extending longitudinally into the central opening of the base, wherein the shaft is configured to be rotated along its vertical axis in frontwards and backwards directions,
        a spring coupled to the shaft beneath the base, wherein the spring is configured to bias the shaft toward a fully backwards rotational position,
        a lever coupled to the shaft beneath the base and extending from the shaft in a non-parallel direction to the vertical axis, wherein the lever is configured to rotate the shaft to a fully frontwards rotational position,
        a gear having gear teeth and coupled to the shaft within the base, wherein the gear is configured to rotate with the shaft about the vertical axis,
        a plate coupled to the top side of the base, the plate having a flat upper surface and first and second slotted openings therethrough, wherein the first and second slotted openings are oriented along a single straight line,
        first and second vertically oriented pins extending through the first and second slotted openings of the plate, each of the first and second vertically oriented pins having a pin head with a diameter that is greater than the diameter of its pin, wherein each pin head is configured to pass vertically through the enlarged region of a vertical opening of the gripping geometry while being unable to pass vertically through the narrower slotted region of that vertical opening, and
        first and second pin carriers located within the first and second recesses within the base, each of the first and second pin carriers being coupled to a respective one of the first and second vertically oriented pins and having a toothed portion that engages the gear teeth, wherein each of the first and second pin carriers is configured to reside at a default position with its respective pin at a maximum distance away from the vertical axis when the shaft is biased toward the backwards rotational position by the spring and to slide in a direction orthogonal to the vertical axis so that its respective pin moves to a fully actuated position with its respective pin at a minimum distance away from the vertical axis when the lever rotates the shaft to the fully frontwards rotational position.

2. The dental model gripping system of claim 1, wherein the first and second vertical openings of the first dental model are configured to receive collectively the first and second vertically oriented pins of the dental model gripper therethrough when the shaft is rotated to a first rotational position between the fully backwards rotational position and fully frontwards rotational position.

3. The dental model gripping system of claim 1, wherein the replica set of teeth have the same size and shape as the teeth of a human patient.

4. The dental model gripping system of claim 1, wherein the first vertically oriented pin is integrally formed with the first pin carrier and the second vertically oriented pin is integrally formed with the second pin carrier.

5. The dental model gripping system of claim 1, wherein the gear is a spur gear and the spring is a torsion spring.

6. The dental model gripping system of claim 1, wherein the dental model gripper further includes a support bracket having a first mounting component extending into and mounted within the central opening of the base, a second mounting component configured to mount the dental model gripper to an external item, and a hollow center region configured to hold and stabilize the shaft therein.

7. The dental model gripping system of claim 1, further comprising:
  a second dental model including:
    a second upper region including a second replica set of teeth,
    a second lower region coupled to the second upper region, the second lower region including a horizontal bottom surface having one or more flat areas, and
    a second gripping geometry positioned along the bottom surface, the second gripping geometry including third and fourth vertical openings through the bottom surface and spaced apart by a second opening distance that is different than the first opening distance, wherein the each of the third and fourth vertical openings includes an enlarged region and a narrower slotted region extending away from the enlarged region in a direction opposite the other vertical opening,
    and wherein the third and fourth vertical openings of the second dental model are configured to receive collectively the first and second vertically oriented pins of the dental model gripper therethrough when the shaft is rotated to a second rotational position between the fully backwards rotational position and fully frontwards rotational position, the second rotational position being different than the first rotational position.

8. A dental model gripping system, comprising:
  a dental model including a replica set of teeth and a substantially flat bottom surface located beneath the replica set of teeth, wherein the substantially flat bottom surface includes first and second vertical openings spaced apart by an opening distance; and
  a dental model gripper having a substantially flat top surface and first and second pins extending vertically through the top surface, at least one of the first and second pins being configured to move in a sliding motion toward and away from the other pin,
  wherein the first and second pins are configured to be arranged at an engaging position where the first and second pins are spaced apart by the opening distance and are insertable into the first and second vertical openings of the dental model,
  wherein the first and second pins are further configured to be arranged at a gripping position while inserted into the first and second vertical openings of the dental model, the gripping position resulting in a greater distance between the first and second pins than the opening distance, and
  wherein at least one of the first and second pins press against internal surfaces within the first and second vertical openings of the dental model to grip firmly the bottom surface of the dental model against the top surface of the dental model gripper while the first and second pins are at the gripping position.

9. The dental model gripping system of claim 8, wherein the first and second pins cannot be released from the dental model while the first and second pins are at the gripping position.

10. The dental model gripping system of claim 9, wherein each of the first and second vertical openings include an enlarged region and a narrower slotted region extending away from the enlarged region in a direction opposite the other vertical opening, and wherein the internal surfaces within the first and second vertical openings are tapered to facilitate gripping.

11. The dental model gripping system of claim 8, wherein the first and second pins are spring biased toward the gripping position.

12. The dental model gripping system of claim 8, wherein the substantially flat bottom surface of the dental model conforms to a standardized gripping geometry suitable for use with the dental model gripper.

13. The dental model gripping system of claim 12, wherein the dental model gripper is configured to grip other dental models having a substantially flat bottom surface that conforms to the standardized gripping geometry.

14. The dental model gripping system of claim 13, wherein at least some of the other dental models include substantially flat bottom surfaces with vertical openings spaced apart by a distance that is different than the opening distance of the dental model.

15. The dental model gripping system of claim 8, wherein the dental model gripper further includes a base having a top side, a bottom side, and a central opening at the bottom side, a shaft defining a longitudinal vertical axis and extending longitudinally into the central opening of the base, wherein the shaft is configured to be rotated along its vertical axis in frontwards and backwards directions, and one or more translation components located within the base and configured to translate rotational motion of the shaft into the sliding motion of the first and second pins.

16. The dental model gripping system of claim 15, wherein the one or more translation components includes a gear coupled to the shaft, a first pin carrier coupled to the gear and to the first pin, and a second pin carriers coupled to the gear and to the second pin.

17. The dental model gripping system of claim 15, wherein the shaft is configured to be manually rotated to slide the first and second pins to the engaging position and to slide the first and second pins to the gripping position.

18. The dental model gripping system of claim 15, wherein the shaft is configured to be rotated automatically by a separate actuating component to slide the first and second pins to the engaging position and to slide the first and second pins to the gripping position.

19. A dental model gripper, comprising:
  a base including a top side, a bottom side, a central opening at the bottom side, and first and second recesses formed therein;
  a shaft defining a longitudinal vertical axis, the shaft extending longitudinally into the central opening of the base, wherein the shaft is configured to be rotated along its vertical axis in frontwards and backwards directions;
  a spring coupled to the shaft beneath the base, wherein the spring is configured to bias the shaft toward a fully backwards rotational position;

a lever coupled to the shaft beneath the base and extending from the shaft in a non-parallel direction to the vertical axis, wherein the lever is configured to rotate the shaft to a fully frontwards rotational position;

a gear having gear teeth and coupled to the shaft within the base, wherein the gear is configured to rotate with the shaft about the vertical axis;

a plate coupled to the top side of the base, the plate having a flat upper surface and first and second slotted openings therethrough, wherein the first and second slotted openings are oriented along a single straight line;

first and second vertically oriented pins extending through the first and second slotted openings of the plate, each of the first and second vertically oriented pins having a pin head with a diameter that is greater than the diameter of its pin, wherein each pin head is configured to pass vertically through a vertical opening along a bottom surface of a separate dental model; and first and second pin carriers located within the first and second recesses within the base, each of the first and second pin carriers being coupled to a respective one of the first and second vertically oriented pins and having a toothed portion that engages the gear teeth, wherein each of the first and second pin carriers is configured to reside at a default position with its respective pin at a maximum distance away from the vertical axis when the shaft is biased toward the backwards rotational position by the spring and to slide in a direction orthogonal to the vertical axis so that its respective pin moves to a fully actuated position with its respective pin at a minimum distance away from the vertical axis when the lever rotates the shaft to the fully frontwards rotational position.

20. The dental model gripper of claim 19, wherein the vertical openings along the bottom surface of the separate dental model conform to a standardized gripping geometry, and wherein the dental model gripper is configured to grip other dental models having a bottom surface that conforms to the standardized gripping geometry.

* * * * *